Figure 1:
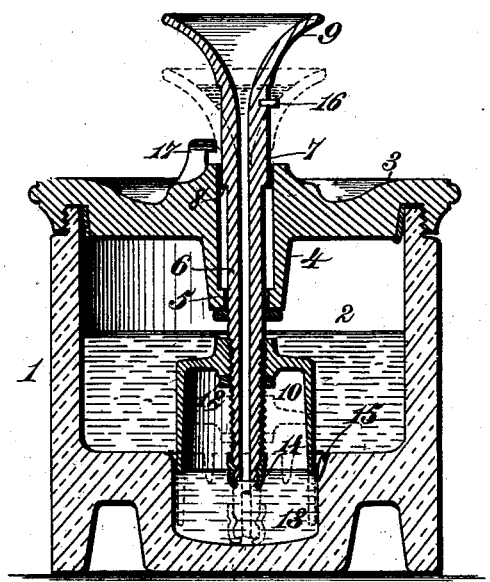

(No Model.)

J. HEBERLING.
FOUNTAIN INKSTAND.

No. 425,672.

Patented Apr. 15, 1890.

Witnesses.

Inventor:
John Heberling
By James L. Norris.
Atty.

UNITED STATES PATENT OFFICE.

JOHN HEBERLING, OF ROCHESTER, NEW YORK, ASSIGNOR OF ONE-HALF TO MYRON W. SPRAGUE, OF SAME PLACE.

FOUNTAIN-INKSTAND.

SPECIFICATION forming part of Letters Patent No. 425,672, dated April 15, 1890.

Application filed December 13, 1889. Serial No. 333,640. (No model.)

*To all whom it may concern:*

Be it known that I, JOHN HEBERLING, a citizen of the United States, residing at Rochester, in the county of Monroe and State of New York, have invented new and useful Improvements in Fountain-Inkstands, of which the following is a specification.

My invention relates to that class of inkstands generally known as "fountain-stands," in which the writing-fluid is driven from the main reservoir or cistern through a tube to the ink-cup or fountain-cup.

It is the purpose of my present invention to provide a novel, simple, and comparatively inexpensive construction and combination of parts, whereby the air-compression chamber shall be so located that it shall be practically removed from those considerable changes in temperature which have frequently heretofore caused the inkstand to overflow its cup, and which are constantly the source of irregularity in the supply and evaporation and waste of ink. It is my object, therefore, to arrange the air-chamber in the bottom or lower portion of the stand or reservoir, and to wholly confine therein the small body of air which constitutes the compressible air-cushion, the cup being mounted upon a tubular stem, which enters and has its lower end normally lying in the said chamber and surrounded by an inverted cup, within which the air or fluid compression takes place, and to which it is confined. It is one purpose of this construction to balance a small degree of such compression by the gravity of the plunger, cup, and compressor, and to enable the operator to fill the cup and at the same time supply his pen by a gentle downward pressure, the parts automatically restoring themselves to normal position and emptying the cup the moment the pen is raised therefrom.

It is a further purpose of my invention to locate the area of air or fluid pressure, or both combined, within the lower part of the cistern or ink-reservoir, whereby the necessity of forming "ground joints" or interposing packing at the junction between the cover and the body of the stand shall be wholly avoided, the expense of construction materially reduced, and the convenience and cleanliness of the fingers of the person using the stand greatly promoted. The constant or frequent contact of the volatile fluid with the screw-threads, ground surfaces, or packing-cushions heretofore used in stands requiring a hermetically-sealed top has invariably produced great annoyance, waste of ink, and loss of time, as they need frequent cleansing to prevent the ink from clogging the joint so effectually that the force required to effect a separation will in a measure destroy the inkstand. These stands also are always liable to the objection already referred to of a sudden and excessive expansion by heat, which will overflow the fountain-cup, and unless the top is removed or an air-vent opened will only cease after a large part of the ink is wasted.

My invention also contemplates a simple, inexpensive, easily-operated, and cleanly organization, whereby the fountain-cup may be supplied by a momentary or intermittent flow of substantially uniform volume, or may be permanently filled and retained in that condition for any desired period, or until the limited supply it contains is exhausted, the contact of the fluid being wholly confined to the interior of the supply-tube or tubular stem, whereby clogging of the exposed joints is avoided, while the bearing-surfaces are normally submerged, and thereby preserved from accumulations.

Finally, my invention comprises an extremely simple and comparatively inexpensive construction, whereby the compressor may be adjusted to vary the volume of ink entering the cup at each compression, and means whereby the tubular mouth of the stand is automatically closed upon its inversion or capsizal to cut off the escape of ink.

To enable others skilled in the art to make, construct, and use my said invention, I will proceed to describe the same in detail, reference being had to the accompanying drawings, in which—

Figure 2:
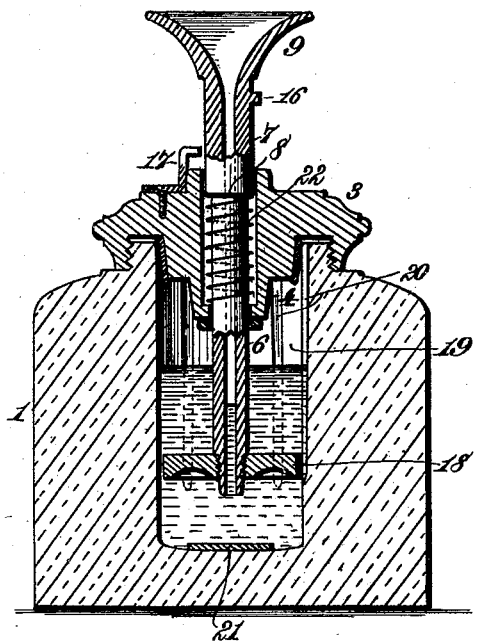
Figure 3:
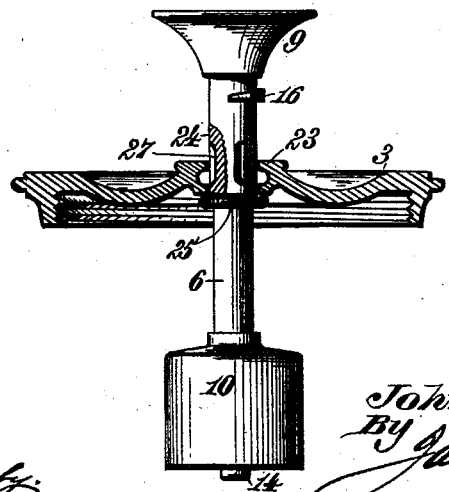

Figure 1 is a central vertical section of an inkstand in which my invention is embodied, the cup being shown in two positions. Fig. 2 is a similar section showing a modified construction and combination of parts. Fig. 3 is a detail side elevation, partly in section, of the fountain-cup and tubular stem and the cap or cover, the same being a further modification of the construction shown in Fig. 1.

In the said drawings, the reference-numeral 1 denotes the body of an inkstand of any desired size or form. This body may be made of glass, porcelain, or any other suitable material, said body inclosing a reservoir 2 of any desired size and shape. This reservoir is inclosed above by a cover or cap 3, which may be constructed of like material with the body, or of any suitable different material—such, for example, as hard rubber. This cover or cap may also extend over the entire top of the reservoir, or the body may be provided with a contracted neck, and in either case the joint between the parts may be of any form which will preserve their union under ordinary contingencies without closing the reservoir hermetically.

In the center of the cover I form or attach a vertical tubular bearing or guide-socket 4, which may drop somewhat below the cap or cover, and is provided at its lower end with an inwardly-turned collar 5. Within this bearing is arranged the tubular stem 6, upon which is formed an enlarged portion 7, which loosely fits the said bearing to have free vertical movement therein.

Mounted upon the lower portion of the stem is the inverted open-mouthed compression cup or bell 10, which is adjustable upon a threaded portion of the stem and locked in position by a jam-nut 12. This open inverted cup or bell has its open end lying just within the mouth of a central chamber or well 13, which drops below the bottom of the reservoir proper 2. The tubular stem, on which the inverted cup or bell is mounted, extends downward, preferably, to a point a little below the plane of the open end of said cup or bell, and is shod at its extremity with a rubber or other elastic collar 14, which receives the impact of the stem upon the bottom of the well 13. The mouth of the well is slightly flared or expanded to facilitate the ready entrance of the open inverted cup or bell, and in the flaring portion I may cut at short intervals shallow slots 15, which extend a little below the mouth of the well, for a purpose presently to be shown.

The reservoir being supplied with any suitable quantity of ink, the cover is applied, the open inverted cup or bell descending into the body of ink contained therein, and causing a slight compression of the body of air inclosed by said cup or bell. This compression causes the ink to rise in the tubular stem until the vertical column displaced balances the gravity of the parts. It will be clearly understood that the displacement of fluid effected by the open inverted cup is nearly sufficient to sustain it, so that a column of ink lying in the tubular stem without entering the fountain-cup will balance the weight of the cup or bell with its open end a little within the central well or chamber, as shown in Fig. 1. A very slight pressure upon the fountain-cup 9, by which the open inverted cup or bell is caused to descend but little in the well or chamber 13, will produce a degree of air-compression therein sufficient to fill the fountain-cup, while the removal of such pressure will permit the parts to rise and resume their normal position, the fountain-cup instantly emptying by the return of the ink to the well. The insertion of a pen within the contracted throat of the fountain-cup, with the slight thrust ordinarily given in dipping the pen, will be sufficient to cause a rise of ink that will fully charge without overcharging the pen.

The fountain-cup 9 may be permanently charged with ink by simply forcing it down to the proper point and confining it in a fixed position by any suitable means. I have shown for this purpose a tooth 16, projecting from the stem and adapted by the rotary movement of the latter to engage with a small bracket 17 on the cap or cover. The tooth may, if desired, have a cam-surface engaging the bracket and resembling a section of a screw-thread, whereby the rotary adjustment of the stem when the tooth lies beneath the point of the bracket will drive the stem downward slightly and force the elastic collar 14 against the floor of the well, making a close joint.

It will be seen that the open inverted cup or bell 10 constitutes a species of float, as well as an air-compressing chamber, by which the stem and its parts are balanced and sustained in the fluid contained within the reservoir 2. I may, however, substitute for this construction a piston-head 18, mounted upon the tubular stem, the lower open end of which drops a little below the piston. I may also dispense with the reservoir 2 entirely and use a well or chamber 19, which, as shown in Fig. 2, is of the same diameter throughout, and this construction may be adopted with either form of ink-forcing or air-compressing device. When the piston-head 18 is employed, it is caused to fit the well or chamber 19 with just sufficient accuracy to sustain the column of ink driven up in the tubular stem and fountain-cup during the upward flow. When the fountain-cup is filled, the tubular stem is closed by the descent of its open end upon a cushion 21, lying in the bottom of the chamber, thus closing the tube and retaining the ink within the fountain-cup as long as the stem is held in that position. In order that the rise and fall of the ink may be of substantially uniform volume, the wall of the chamber or well 19 is provided with vertical channels 20 at short intervals, extending from the top to a point above the bottom of the well. As the piston moves upon the channeled portion of the chamber, the fluid beneath it is merely displaced by flowing through said channels to the other side of said piston; but as the latter passes the lower ends of these channels 20 it forms a sufficiently close joint with the wall of the chamber to drive the ink upward into the fountain-cup, and the opening in the tubular stem is the only avenue whereby escape may be made as the piston is pressed downward. The ink is thus forced into the fountain-cup, which is filled properly at the moment when the open end of the tubular stem abuts against the cushion 21 at the bottom of the well. The stem and plunger are raised by a light spring 22, coiled on said stem between the collar 5 of the bearing and the shoulder 8 on the stem. The same means may be provided for locking the stem in its depressed position as those already illustrated and described.

The inverted cup or bell shown in Fig. 1 may be used interchangeably in the reservoir shown in Fig. 2 in place of the piston-compressor.

The slots 15, formed in the mouth of the well or chamber 13, extend a little below the plane in which the open mouth of the open inverted cup or bell 10 normally stands to enable the ink to pass from the reservoir into the chamber or well as the ink is gradually consumed in the fountain-cup. The vertical channels 20 serve a similar purpose in the modified construction shown in Fig. 2.

In the construction shown in Fig. 1 the descent of the inverted cup or bell causes a slight increase of space within the reservoir, due to the fact that a certain degree of air-compression takes place within the cup or bell, while at the same time a small quantity of ink is withdrawn to fill the fountain-cup. To supply the small quantity of air to the reservoir necessary to compensate for this increase, and to allow the unobstructed escape of this air as the inverted cup or bell rises and the ink returns from the fountain-cup to the chamber 13, and to effect this result and at the same time close the reservoir so perfectly as to prevent the escape of ink should the stand be upset, I provide the construction shown in Fig. 3. In this form the cover or cap 2 is shown as of much lighter construction, and the tubular bearing or guide 4 may be practically dispensed with. In place thereof a socket-bearing 23 is formed in any suitable manner, in which the neck 24 of the tubular stem fits closely, said neck being included between the collar 25 and that portion of the stem which has bearing within the socket as the cup descends. In this neck I cut one or more vertical channels 27, of suitable depth, which terminate at their lower extremities a little above the collar 25 and at their opposite ends at such a point that when the said collar lies against the lower surface of the socket-bearing 23 the upper ends of said slots shall be exposed above the top of said socket-bearing. When the parts are in the position described, the channels are closed by reason of the fact that their lower ends lie within the socket-bearing. As the fountain-cup is depressed they are opened sufficiently to admit the increased quantity of air; but as the fountain-cup reaches its lowest point the upper extremities of said channels pass into the socket-bearing and are closed. When the fountain-cup rises, the reverse action takes place, the channels being opened during its rise, but closed an instant before the collar 25 seats upon the under surface of the socket. Thus in both positions of the fountain-cup the stand is practically sealed tight, and no ink can escape should it be upset, while at the same time one or more channels are provided for the entrance and escape of air to the reservoir at each flow and return of ink to and from the fountain-cup.

It will be understood that the open inverted cup or bell 10 is intended to be practically submerged, in order that its confined body of air may cause it to act in a measure as a float to sustain the tubular stem and fountain-cup in the position shown in Fig. 1 and already fully described. As the ink is used, the cup or bell may become partially exposed; but by properly supplying the reservoir at occasional intervals the perfect action of the parts in this respect will be insured.

The fountain-cup and the tubular stem may be made in one integral piece, or in two separate pieces united, and the diameters of the openings at the point of union may be the same, or that of the cup may be greater than that of the stem, as shown in dotted lines in Fig. 1.

What I claim is—

1. In a fountain-inkstand, a fountain-cup sustained by an open-mouthed inverted cup or bell, serving as a combined float and compressor to cause ink to flow to the fountain-cup by the compression of air within said cup, substantially as described.

2. In a fountain-inkstand, the combination, with a suitable reservoir, of a fountain-cup mounted upon a tubular stem, which rises and falls in a guide or bearing, and an open inverted cup or bell serving as a combined float and compressor and mounted upon said stem, substantially as described.

3. In a fountain-inkstand, the combination, with a suitable reservoir having a central chamber or well in its bottom, of a fountain-cup mounted on and communicating with a tubular stem, which rises and falls in a guide or bearing, and an open inverted cup or bell to act both as a float and an air-compressor, mounted upon the tubular stem and rising and falling in said chamber or well, substantially as described.

4. In a fountain-inkstand, the combination, with a suitable ink-reservoir, of a fountain-cup mounted on and communicating with a tubular stem, which is partly submerged in said reservoir, and an open inverted cup or bell mounted on the stem, the end of the latter dropping to or a little beyond the open end of the cup or bell, substantially as described.

5. In a fountain-inkstand, the combination, with a suitable reservoir, of a cover having a central guide or bearing, a tubular stem rising and falling in said bearing and having a fountain-cup on its upper end, and an open inverted cup or bell adjustably mounted on the stem, which drops to or nearly to the open mouth of said cup or bell, substantially as described.

6. In a fountain-inkstand, the combination, with a suitable reservoir, of a cover having a central guide or bearing, a fountain-cup mounted on and communicating with a tubular stem, and an open inverted cup or bell adapted to act as a float and compressor, mounted on the tubular stem, the lower end of which drops to the mouth of the inverted cup, or nearly so, and is provided with a yielding or elastic collar or packing, substantially as described.

7. In a fountain-inkstand, the combination, with a suitable reservoir having a cap or cover provided with a central vertical guide, of a tubular stem mounted in said guide, an open inverted cup or bell adapted to act as a float and compressor, mounted on the stem, which drops beyond the open mouth of the inverted cup and is shod with a yielding or elastic collar or packing, and a fountain-cup mounted on the tubular stem, the latter being provided with a detent or tooth adapted to engage a bracket on the cover, substantially as described.

8. In a fountain-inkstand, the combination, with a suitable reservoir having a cover or cap, of a tubular stem having vertical movement in a socket-bearing in said cap and provided with one or more air-channels cut from a point a little above a collar on the stem, which seats against the socket to a point above said socket, an open inverted cup or bell mounted on the lower portion of the stem, and a fountain-cup mounted on its upper end, substantially as described.

9. In a fountain-inkstand, the combination, with a suitable reservoir having a central well or chamber in its bottom, of a tubular stem rising and falling in a socket-bearing in a cover closing said reservoir, an open inverted cup or bell on the lower part of the stem, the open end of the latter dropping slightly below the open end of the inverted cup, which has its open end lying in the mouth of the well, and a fountain-cup on the upper end of the stem, the latter being provided with air-channels, the lower ends of which are closed as the cup rises and the upper ends closed as it sinks, said channels being open at both ends, however, at each rise and fall, substantially as described.

In testimony whereof I have affixed my signature in presence of two witnesses.

JOHN HEBERLING.

Witnesses:
 JAMES L. NORRIS,
 JAMES A. RUTHERFORD.